Aug. 20, 1929.　　G. MAIURI ET AL　　1,725,658
REFRIGERATING MACHINE OF THE ABSORPTION TYPE
Filed Feb. 13, 1929
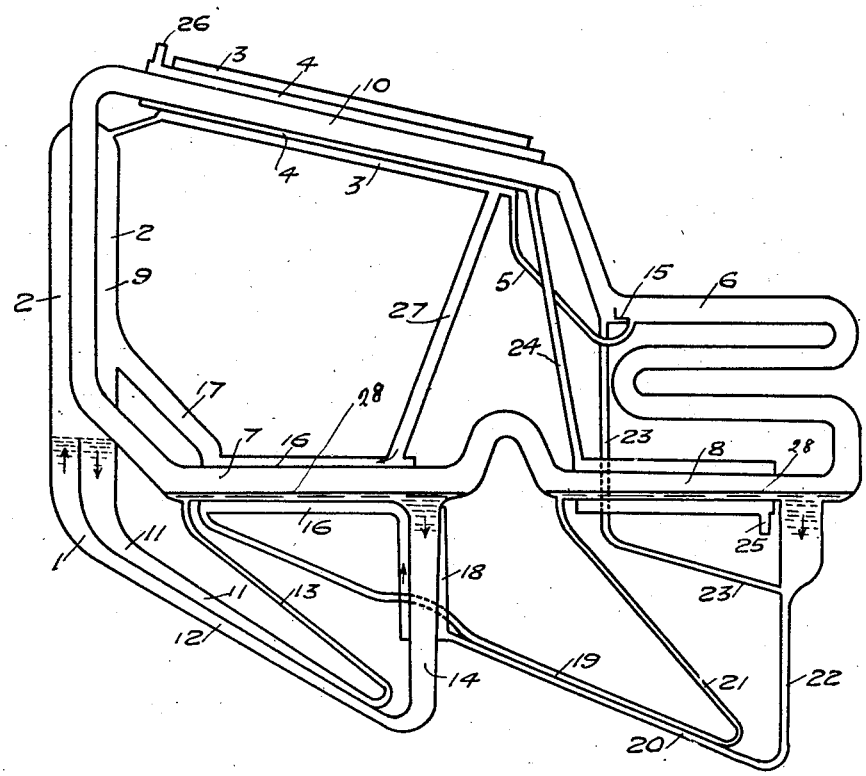
Inventors
Guido Maiuri
and Raoul F. Bossini
by Wilkinson & Giusta
Attorneys.

Patented Aug. 20, 1929.

1,725,658

UNITED STATES PATENT OFFICE.

GUIDO MAIURI AND RAOUL FELICE BOSSINI, OF LONDON, ENGLAND.

REFRIGERATING MACHINE OF THE ABSORPTION TYPE.

Application filed February 13, 1929, Serial No. 339,706, and in Great Britain February 10, 1928.

Our invention relates to a refrigerating machine of the continuous-cycle absorption type, in which the pressures are equalized by means of an inert gas. This invention aims at obtaining in such a machine the greatest possible efficiency.

In our invention the absorber is divided into two portions with two independent liquid circulations, for instance ammoniacal, and the heat due to absorption in the first portion is utilized for liberating refrigerant from the strong liquor formed in the second portion, such refrigerant being afterwards condensed and led to the evaporator.

The machine according to our invention has in effect two absorbers and two boilers, of which the first boiler is heated by an external source of heat and the second boiler is heated by the heat due to absorption in one of the absorbers. Thus with a single source of heat a double effect is obtained.

The two gaseous circulations can be kept completely separate by having also two separate condensers and evaporators instead of only one of each, which is equivalent to having two separate machines with only one externally heated boiler.

It is possible to avoid high temperature by adding in the known manner to the liquid some substance which will lower the temperature of ebullition of the water, for example, glycerine, in one of the two circuits, or by dissolving in the other circuit a substance such as calcium chloride which lowers the tension of the vapour, and thus augments the absorption in the part of the absorber where the liquid is richer, this will diminish the heat required for generation and increase the quantity of ammonia delivered to the condenser.

An example of a refrigerating machine according to the present invention is illustrated in the accompanying drawing which is a diagrammatic sectional elevation of a machine having a single condenser and a single evaporator.

1 is a boiler externally heated by a source of heat (not shown), and in which gaseous ammonia is driven off from an absorption liquid and passes to a condenser 3 in which it is liquefied, and from which it flows into an evaporator 6, where it evaporates to produce the desired cooling effect.

In the present machine there are two absorbers 7 and 8, each having a separate and distinct liquor circulation, one of which liquor circulations is heated in the externally heated boiler 1, and the other of which liquor circulations is heated by the heat liberated by the absorption process in the other absorber.

In the arrangement illustrated the gas spaces of the two absorbers 7 and 8 are connected in series and the gaseous stream coming from the evaporator 6 first traverses the absorber 7 and then traverses the absorber 8, whereby the vaporized ammonia is progressively absorbed by the two distinct bodies of absorption liquid in the two absorbers.

The liquor from the absorber 8 and containing absorbed ammonia is not heated in the above-mentioned externally heated boiler 1, but is heated, to drive off its contained ammonia, by the heat due to absorption of ammonia in the other absorber 7. It is the ammoniacal liquor from this other absorber 7 which is supplied to and becomes heated in the externally heated boiler 1.

The liquor from the absorber 7 flows down the pipe 14 and through a heat exchanger 12—11, to the boiler 1 where it is heated and the ammonia vapour freed rises in the top 2 of the boiler 1, whilst the hot liquor returns by the pipe 11 of the heat exchanger and passes by a pipe 13 back to the same absorber 7.

The gaseous ammonia passes from the top 2 of the boiler 1, which acts as a rectifier, to the condenser 3, where it liquefies and passes through a pipe 5 to the evaporating coil 6 where it evaporates; the ammonia vapour mixes with the inert gas in the evaporator 6 and is carried by such gas into the other absorber 8, where part of the ammonia is absorbed by liquor at high concentration which circulates therein. The remainder of the vapour is carried by the inert gas through the inverted U-pipe into the other absorber 7.

The liquor passes from the absorber 8 through a pipe 22 and a heat exchanger 20—19 to a vessel 18, jacketing the above-mentioned pipe 14 and therefore in indirect contact with the hot liquid which circulates inside such pipe 14. In the jacket 18 the liquor from the absorber 8 is warmed and starts to give off ammonia vapour, consequently diminishing its specific weight, and it rises to a jacket 16 constituting a second boiler which surrounds and is in thermal contact with the absorber 7, and receives therefrom the heat of absorption. The ammonia evolved in this second boiler 16 passes through a pipe 17 to the rectifier 2 and from there goes to the condenser 3 together with the ammonia which is evolved from liquor in the externally heated boiler 1.

The circulation of the inert gas takes place by the thermosiphonic principle owing to being heated in a vertical pipe 9, and cooled in a pipe 10 by the water which circulates in a water jacket 4, which also cools the condenser 3.

Any water which condenses in the pipe 10 and which absorbs part of any ammonia which may still be mixed with the inert gas is intercepted by a baffle 15 and is thus diverted from entering the evaporator 6 but drains away through a pipe 23 to the pipe 22.

A pipe 27 connects the condenser 3 to the second boiler 16 and is connected to the gas space of such condenser 3 (in the drawing, however, it is represented, for clearness sake, as attached directly to the lower part of the condenser). This pipe 27 is intended to allow a continuous circulation of any excess of the inert gas which may be in the boiler 1. This will facilitate the evaporation and the condensation and avoid the dissociation of the ammonia. The circulation of the cooling water is obtained by introducing it into an inlet 25, to pass upwards through a pipe 24, the water jacket 4, to an outlet 26.

The liquor circulates in the direction indicated by arrows, up the boiler 1, and down the pipe 11, because it is the boiler 1 which is heated and not the pipe 11. Heating the boiler dissociates vapour from the liquor therein creating an upward circulation due to the reduction of density by the vapour and also by the simple thermo-siphon action. The drawing being diagrammatic, might lead to the belief that the upper portion of the pipe 11 is heated equally with and forms part of the boiler, but this is not so.

The liquor circulation takes place to and from the absorber 8, in the direction indicated, as a result of the bubbles of ammonia developed in the vertical jacket 18, acting as a gas lift.

The liquor returning through 11—13 can absorb ammonia in 7 because it is liquor very weak in ammonia owing to having been highly heated in the boiler 1. Also it has been reduced in temperature by traversing the heat exchanger 11—12. On the other hand it can drive off ammonia in 17 from the liquor derived from the other absorber 8, owing to such liquor being highly saturated with ammonia.

The machine described above can be varied in numerous ways and still retain the principle of our invention, for instance the gas circuit can be separated into two parts including two evaporating coils in parallel so as to have two independent circulations of the inert gas.

What is claimed is:—

1. In a continuous absorption refrigerating machine containing an inert pressure-equalizing gas, an externally heated boiler, an absorber, means circulating liquor directly between said externally heated boiler and said absorber, a second boiler in thermal contact with and heated by said absorber, a second absorber, means circulating liquor directly between said second boiler and said second absorber, means for condensing vaporized refrigerant delivered by said boilers, means for evaporating said condensed refrigerant connected to said absorbers, and means circulating inert gas through said evaporating means and said absorbers.

2. In a continuous absorption refrigerating machine containing an inert pressure equalizing gas, an externally heated boiler, an absorber, means circulating liquor directly between said externally heated boiler and said absorber, a second boiler in thermal contact with and heated by said absorber, a second absorber connected in series to said first-mentioned absorber, means circulating liquor directly between said second boiler and said second absorber, a condenser connected to said boilers, an evaporator connected to said condenser and to said second absorber, and means circulating inert gas through said evaporator and said absorbers.

RAOUL FELICE BOSSINI.
GUIDO MAIURI.